United States Patent
Lei et al.

(10) Patent No.: US 11,034,338 B2
(45) Date of Patent: Jun. 15, 2021

(54) AUTONOMOUS VEHICLE SELF-SCHEDULED REFUELING

(71) Applicant: Ford Motor Company, Dearborn, MI (US)

(72) Inventors: Oliver Lei, Windsor (CA); Shiqi Qiu, Canton, MI (US); John Robert Van Wiemeersch, Novi, MI (US); Jayanthi Rao, West Bloomfield, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 164 days.

(21) Appl. No.: 16/332,495

(22) PCT Filed: Sep. 14, 2016

(86) PCT No.: PCT/US2016/051747
§ 371 (c)(1),
(2) Date: Mar. 12, 2019

(87) PCT Pub. No.: WO2018/052416
PCT Pub. Date: Mar. 22, 2018

(65) Prior Publication Data
US 2020/0180571 A1 Jun. 11, 2020

(51) Int. Cl.
*B60S 5/02* (2006.01)
*B60L 53/60* (2019.01)
*G05D 1/00* (2006.01)
*G06Q 10/06* (2012.01)
*G06Q 50/06* (2012.01)

(52) U.S. Cl.
CPC ............... *B60S 5/02* (2013.01); *B60L 53/60* (2019.02); *G05D 1/0088* (2013.01); *G06Q 10/06316* (2013.01); *G06Q 50/06* (2013.01); *G05D 2201/0213* (2013.01)

(58) Field of Classification Search
CPC ......... B60S 5/02; B60L 53/60; G05D 1/0088; G05D 2201/0213; B06Q 50/06
See application file for complete search history.

(56) References Cited

U.S. PATENT DOCUMENTS 5,163,000 A   11/1992   Rogers et al.
7,523,770 B2   4/2009   Horowitz et al.
(Continued)

FOREIGN PATENT DOCUMENTS

DE   3013080 A1   10/1981

OTHER PUBLICATIONS

International Search Report and Written Opinion re Appl. No. PCT/US2016/051747 dated Nov. 17, 2016.
(Continued)

*Primary Examiner* — Marthe Y Marc-Coleman
(74) *Attorney, Agent, or Firm* — Brandon Hicks; Bejin Bieneman PLC

(57) ABSTRACT

Vehicles can be equipped to operate in both autonomous and occupant piloted mode. Refueling stations can be equipped to refuel autonomous vehicles without occupant assistance. Refueling stations can be equipped with wireless networks that communicate with vehicles to permit autonomous vehicles to self-schedule refueling at fueling stations serving a mixture of autonomous, semi-autonomous and occupant piloted vehicles.

20 Claims, 5 Drawing Sheets

(56) References Cited

U.S. PATENT DOCUMENTS

| | | |
|---|---|---|
| 7,726,360 B2 | 6/2010 | Sato et al. |
| 9,519,284 B2 | 12/2016 | Wurman et al. |
| 10,065,517 B1 | 9/2018 | Konrardy et al. |
| 10,828,999 B1 | 11/2020 | Konrardy et al. |
| 2001/0037839 A1 | 11/2001 | Litt |
| 2005/0176482 A1 | 8/2005 | Raisinghani et al. |
| 2010/0169008 A1* | 7/2010 | Niwa ..................... B60L 3/12 701/532 |
| 2012/0179323 A1 | 7/2012 | Profitt-Brown et al. |
| 2012/0316784 A1 | 12/2012 | Chrysanthakopoulos |
| 2013/0299042 A1 | 11/2013 | Nieuwstraten |
| 2013/0339072 A1 | 12/2013 | Touge |
| 2014/0330623 A1 | 11/2014 | Detrick |
| 2015/0120476 A1* | 4/2015 | Harrell ................. G07F 13/025 705/21 |
| 2015/0310674 A1 | 10/2015 | Humphrey et al. |
| 2017/0174092 A1 | 6/2017 | Kohnke |
| 2017/0240061 A1 | 8/2017 | Waters |
| 2020/0180571 A1 | 6/2020 | Lei et al. |

OTHER PUBLICATIONS

Notice of Allowance dated Nov. 18, 2020 re U.S. Appl. No. 16/332,513, filed Mar. 12, 2019.

* cited by examiner

AUTONOMOUS VEHICLE SELF-SCHEDULED REFUELING

BACKGROUND

Vehicles can be equipped to operate in both autonomous and occupant piloted mode. Refueling stations can be equipped to refuel autonomous vehicles without occupant assistance and can include refueling with liquid fuels, compressed gases and electric charging.

DETAILED DESCRIPTION

Vehicles can be equipped to operate in both autonomous and occupant piloted mode. By autonomous mode, we mean a mode of operation wherein a vehicle can be piloted by a computing device as part of a vehicle information system having sensor and controllers. The vehicle can be occupied or unoccupied, but in either case the vehicle can be piloted without assistance of an occupant. Vehicles can be powered by a variety of fuel types, including liquid petroleum- or alcohol-based fuels, compressed gases such as liquefied petroleum or hydrogen, or electricity. For all fuel types, vehicles can be equipped to be refueled at refueling stations.

Refueling stations can be equipped to provide a variety of refueling options including automated and manual fueling, fuel type and filler type/location. Fuels can include liquid petroleum or alcohol fuels, compressed gases or electric charging. Fueling can be fully automated, requiring the vehicle to be in autonomous mode and operable to respond to commands from a fuel pump, or fueling can be manual, requiring some assistance of an attendant or occupant to complete. Vehicles can require refueling while in autonomous mode. Vehicles in autonomous mode can be programmed to locate refueling stations.

Refueling stations can be equipped to handle a mixture of autonomous, semi-autonomous and occupant piloted vehicles by equipping the vehicles and fueling units with computing devices and wireless technology including cellular telephone networks, WiFi, and dedicated short range communications (DSRC) technology, BLUETOOTH Low Energy (BLE) or other wireless technologies including light-based communication (ex., Ultraviolet, Infrared or Visible light), where a fueling unit is defined as a device equipped to dispense fuels as defined above to vehicles for refueling vehicles. Equipping vehicles and fueling units with computing devices and wireless technology can permit one or more vehicles in autonomous mode to refuel at refueling stations by joining service queues.

In cases where autonomous vehicles include occupants, one or more occupant preferences can be included in determining which service queues to join. Vehicles can communicate with one or more vehicles and one or more service units via wireless networks to determine which service queues to join to minimize wait time while satisfying occupant preferences.

Figure 1:
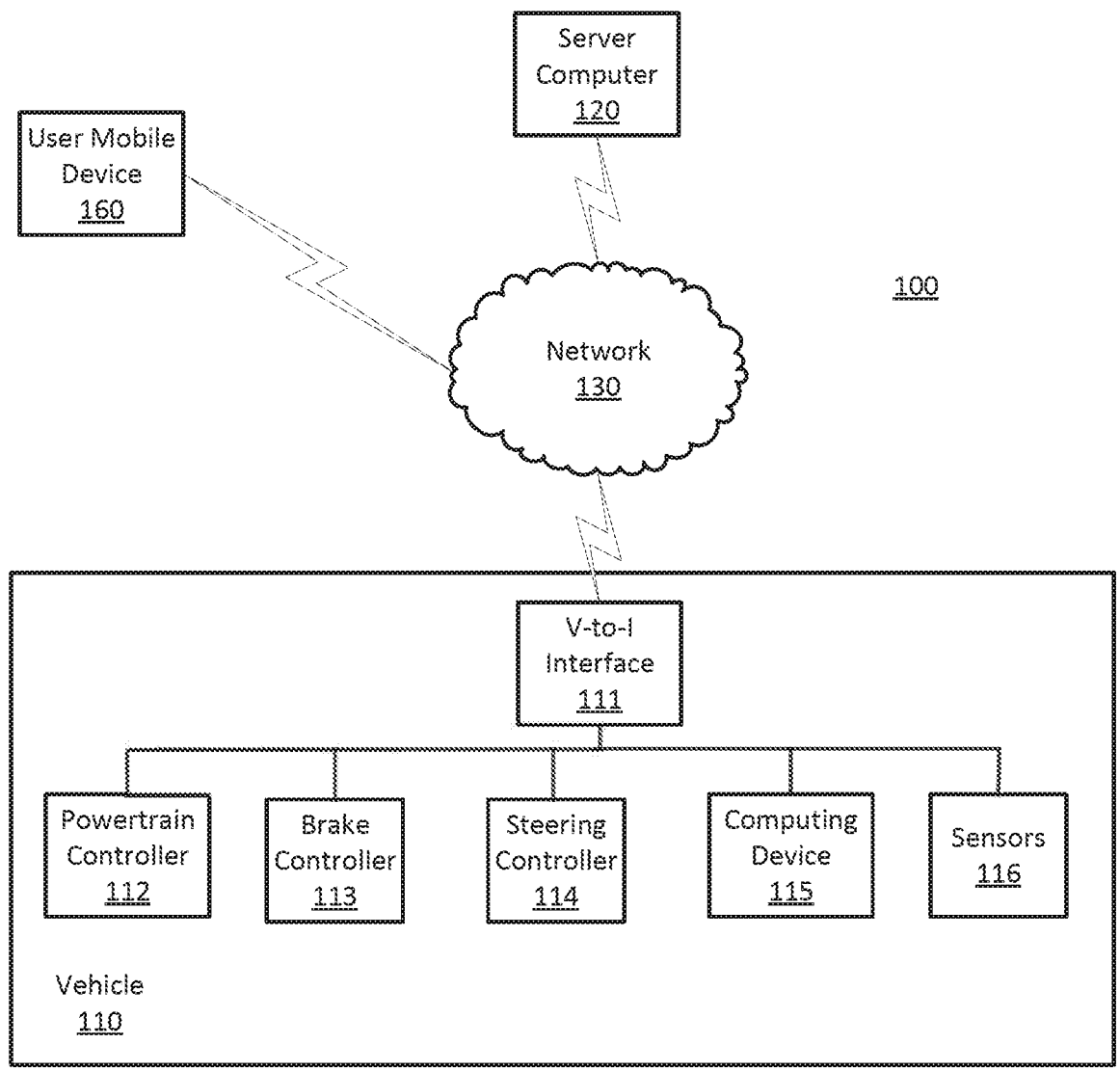
FIG. 1 is a diagram of a vehicle in accordance with disclosed examples.

FIG. 1 is a diagram of a vehicle information system 100 that includes a vehicle 110 operable in autonomous and occupant piloted mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, DSRC, BLUETOOTH® and wired and/or wireless packet networks. The computing device 115 also includes nonvolatile memory such as are known. Computing device can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based vehicle 110 operable in autonomous and occupant piloted mode having three or more wheels, e.g., a passenger car, light truck, etc. The vehicle 110 includes one or more sensors 116, the V-to-I interface 111, the computing device 115 and one or more controllers 112, 113, 114. The vehicle may have pre-mapped data of its environment and probable routes downloaded from the cloud as required for a given route, for example.

The sensors 116 may be programmed to collect data related to the vehicle 110 and the environment in which the vehicle 110 is operating. By way of example, and not limitation, sensors 116 may include e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
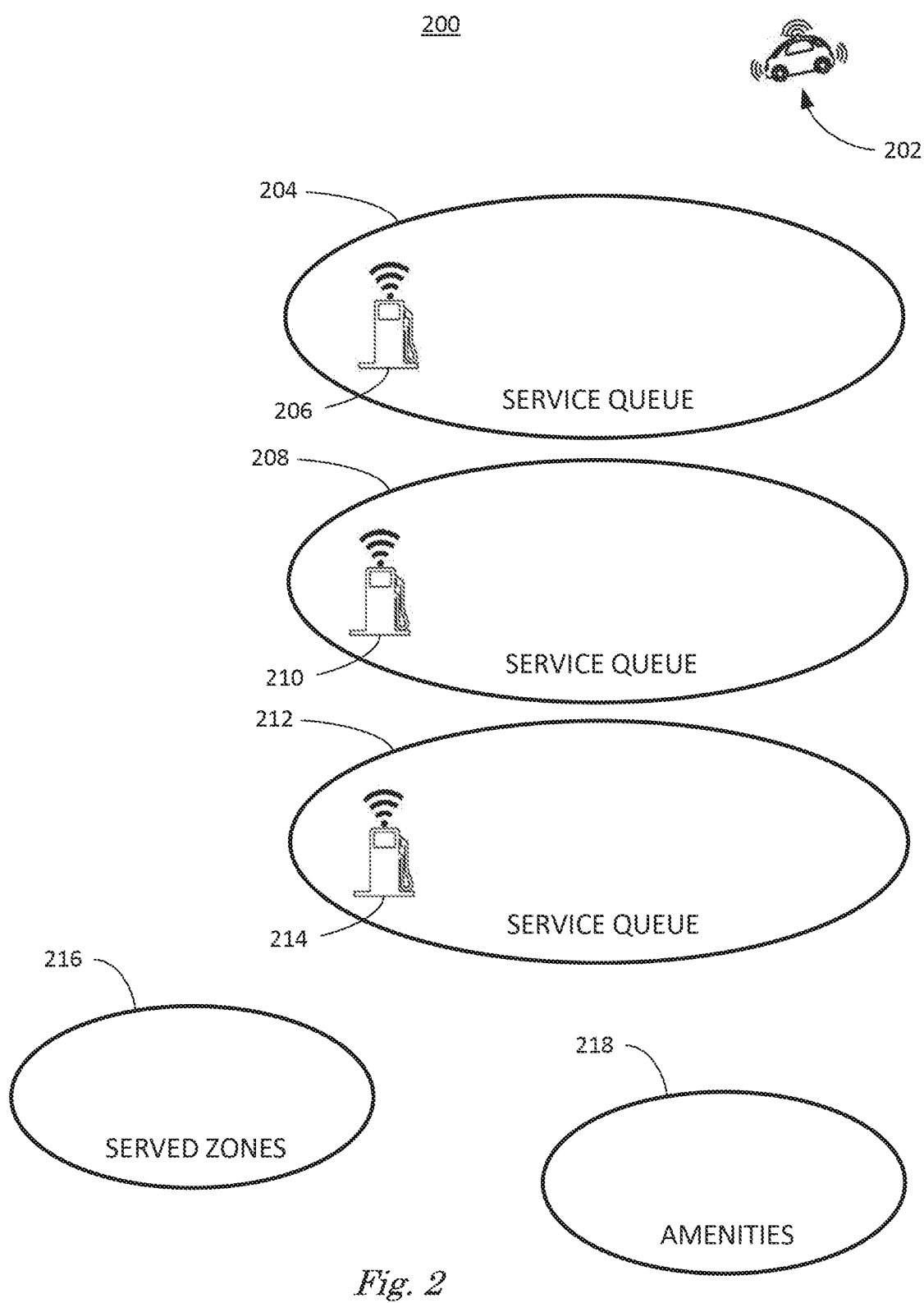
FIG. 2 is a diagram of a refueling station in accordance with disclosed examples.
Figure 3:
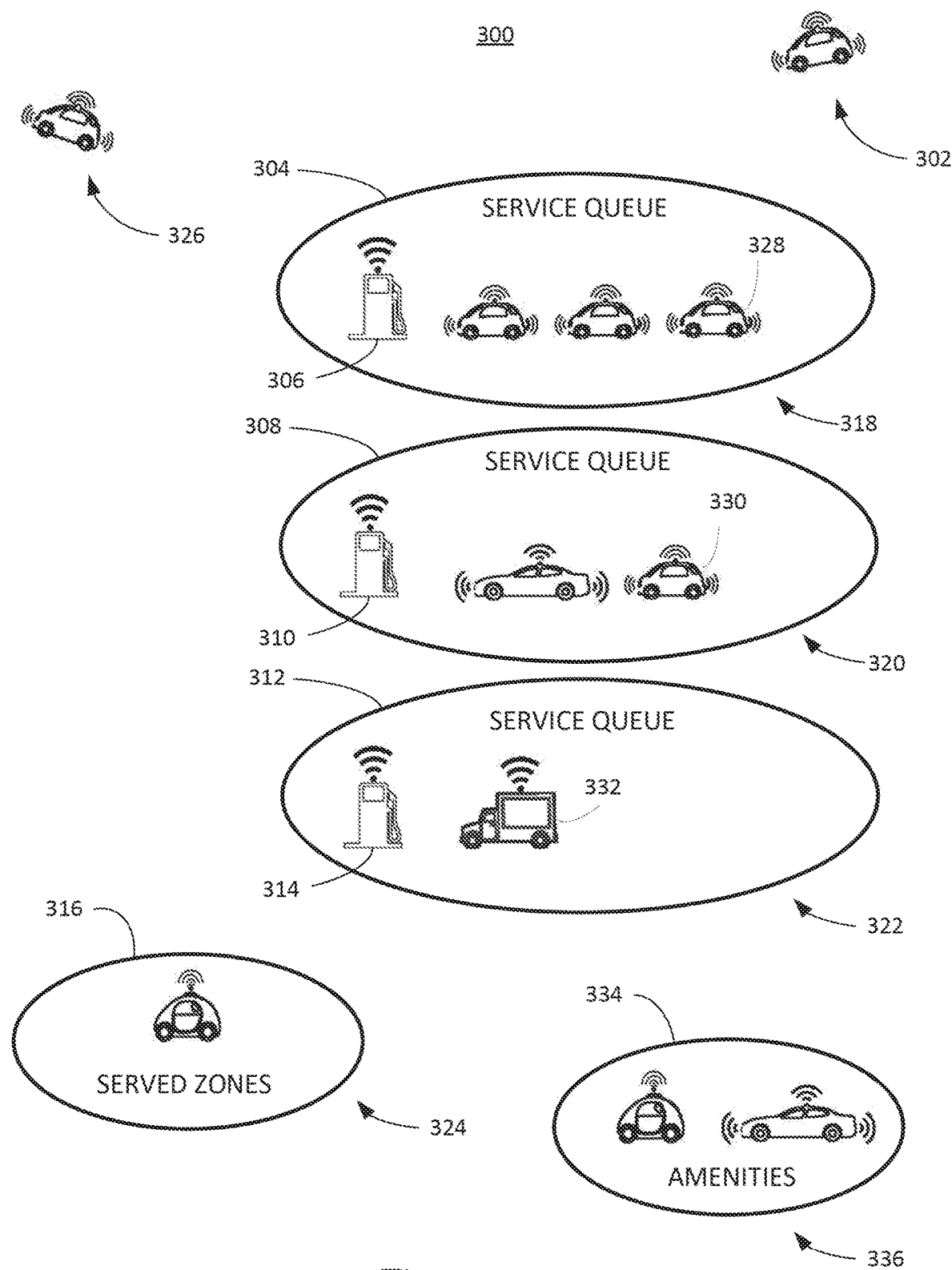
FIG. 3 is a diagram of a refueling station in accordance with disclosed examples.
Figure 4:
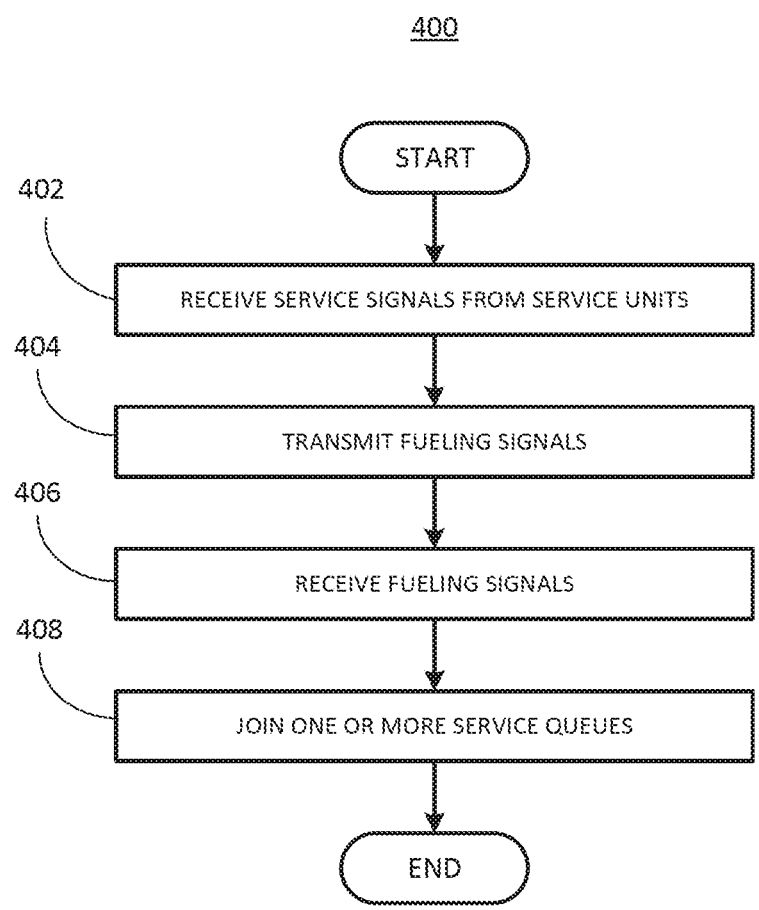
FIG. 4 is a flowchart diagram of a process to join one or more service queues in accordance with disclosed examples.

FIG. 4 is a flowchart diagram of an example process 400 for refueling vehicles 110 in autonomous operation described in relation to FIGS. 2 and 3. Process 400 can be implemented on computing device 115 or in the cloud, inputting information from sensors 116, executing instructions and sending control signals via controllers 112, 113, 114, for example. Process 400 includes multiple steps taken in the disclosed order. Process 400 also includes implementations including fewer steps or can include the steps taken in different orders.

FIG. 2 illustrates an arriving vehicle 202 in autonomous operation arriving at refueling station 200. Refueling station 200 is defined as an area that includes service queues 204, 208, 212 associated with fueling units 206, 210, 214 respectively, served zones 216 and amenities 218 that includes restrooms, restaurants, shops, picnic areas and parking, for example. Fueling units 206, 210, 214 can dispense one or more refueling products, including liquid petroleum- or alcohol-base fuels, compressed gases or electricity.

Fueling units 206, 210, 214 are equipped with DSRC, BLE or other wireless technologies and can each communicate the types and amounts of fuel they dispense and operational characteristics of their dispensing equipment with arriving vehicle 202. Operational characteristics of dispensing equipment can include accepted vehicle fuel input location (left/right), for example, and type of filling nozzle and operation (automated/manual, handicapped accessible) operation. Fueling units 206, 210, 214 can communicate information regarding which type of vehicles 110 are refuelable (trucks/cars, autonomous/occupant piloted) at which fueling unit 206, 210, 214. Fueling units 206, 210, 214 can also maintain information regarding the service queues 204, 208, 212 associated with fueling units 206, 210, 214 respectively.

Refueling station 200 also includes one or more served zones 216 and amenities 218. Served zones 216 are zones to which arriving vehicles 202 can be directed to move to by fueling units 206, 210, 214 when fueling is complete and the arriving vehicle 202 is operating autonomously. Service zone 216 may also be used in cases where there is no intent to refuel but rather for occupants to use restrooms, purchase amenities, or if parking at amenities 218 is full. This zone 216 may also be used when the vehicle 202 has finished fueling but is unoccupied because an occupant associated with the vehicle 202 is away from the vehicle, visiting amenities 218, for example. As discussed above, amenities 218 associated with refueling station 200 includes restrooms, restaurants, shops, picnic areas and parking, for example. Parking includes drop off and pick up, short-term, handicapped and rest areas, for example.

FIG. 3 illustrates a refueling station 300 including amenities 334, service queues 304, 308, 312 with associated fueling units 306, 310, 314 respectively and served zones 316. FIG. 3 includes arriving vehicle 302 and departing vehicle 326. Service queues 304, 308, 312 include queued vehicles 318, 320, 322 respectively, while served zones 316 include served vehicles 324 and amenities 334 can include parked vehicles 336.

Fueling units 306, 310, 314 can include information regarding queued vehicles 318, 320, 322. Information can include the number of vehicles, the amount of fuel each vehicle is requesting and an estimate of the amount of time required to fuel the vehicles. Fueling units 306, 310, 314 can also include information regarding the last vehicle 328, 330, 332 in each service queue 304, 308, 312.

FIG. 4 illustrates a process 400 for joining a service queue 304, 308, 312 associated with fueling units 306, 310, 314 by communicating wirelessly with fueling units 306, 310, 314. This permits vehicles 110 operating in both autonomous mode and operator-piloted mode that communicate wirelessly with fueling units 306, 310, 314 to join service queues 304, 308, 312 and refuel at fueling units 306, 310, 314 cooperatively with other vehicles not communicating with fueling units 306, 310, 314 via wireless networking.

In FIG. 4, process 400 starts at step 402, where computing device 115 according to the process 400 associated with arriving vehicle 302 receives service signals from fueling units 306, 310, 314 via DSRC, BLE or other wireless technologies. As discussed above, service signals include the types of fuel and operating characteristics of the fueling units 306, 310, 314. Service signals also include information regarding the service queues 304, 308, 312 associated with the fueling units 306, 310, 314.

At step 404 computing device 115 associated with arriving vehicle 302 transmits fueling signals via DSRC, BLE or other wireless technologies. Fueling signals include types and amounts of fuels requested and location and operating characteristics of fuel inlet. Arriving vehicle 302 can be occupied. In this case, fueling signals can include occupant preferences. Occupant preferences can include preferences for fueling including self, attended, or automated service and preferences for visiting amenities 334. For example, an arriving vehicle 202 with elderly person or someone with crutches my prefer to use service the queue 304, 308, 312 closest to the restroom to minimize the distance they must walk. Step 404 can be repeated by arriving vehicle 302 anytime while visiting refueling station 300.

At step 406, computing device 115 associated with arriving vehicle 302 receives via DSRC, BLE or other wireless technologies fueling signals transmitted by one or more vehicles 318, 320, 322, 324, 336. Receiving fueling signals transmitted by one or more vehicles 318, 320 can permit arriving vehicle 302 to identify which vehicles 318, 320, 322, 324, 336 are associated with which service queues 304, 308, 312, for example.

At step 408 computing device 115 directs arriving vehicle 302 to join a service queue based on the received service signals and fueling signals. Computing device 115 can determine which service queue to join based on matching fuel type and amount requested with fuel types and amounts available at fueling units 306, 310, 3143 and the estimated wait time for each, for example.

Since, as discussed above, service signals include information regarding the last vehicle 328, 330, 332 in each service queue 304, 308, 312, permitting arriving vehicle 302 to find and queue up behind appropriate last vehicle 328, 330, 332, thereby maintaining order among vehicles 318, 320, 322, 324, 336 at refueling station 300, some of which are under autonomous control and some of which are under occupant-piloted control. Some vehicles 318, 320, 322, 324, 336 are semi-autonomous, capable of operating autonomously, semi-autonomously, and occupant-piloted.

At step 408 computing device 115 can direct arriving vehicle 302 to move to amenities 334 and join the parked vehicles 336 based on occupant preferences. Arriving vehicle 302 can remain parked at amenities 334 while occupant visits amenities 334, or arriving vehicle 302 can join a service queue 304, 308, 312 under autonomous control after dropping off occupant at amenities 334, for example.

Figure 5:
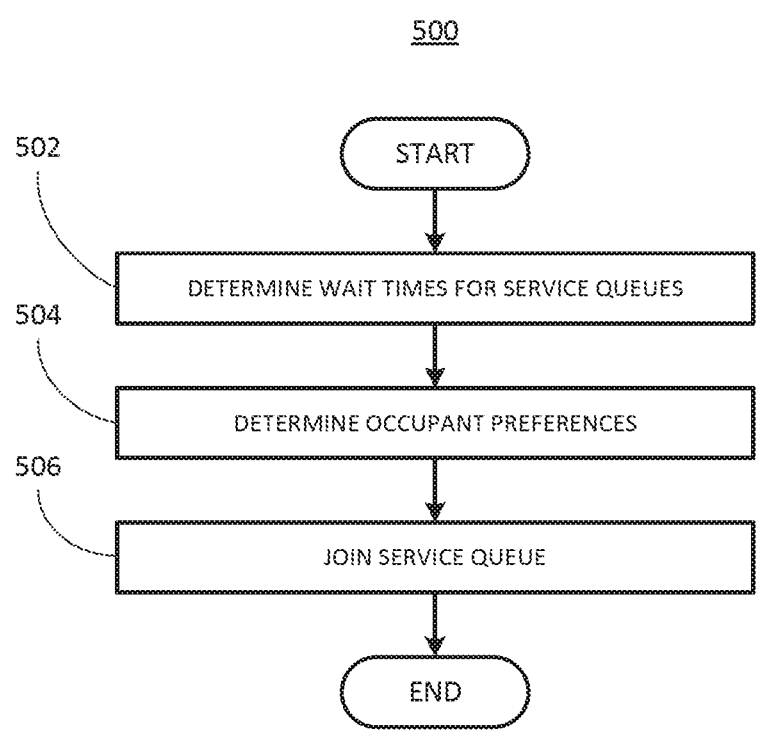
FIG. 5 is a flowchart diagram of a process to join one or more service queues in accordance with disclosed examples.

FIG. 5 is a flowchart diagram of an example process 500 for refueling vehicles 110 in autonomous operation described in relation to FIGS. 2 and 3. Process 500 can be implemented on computing device 115, inputting information from sensors 116, executing instructions and sending control signals via controllers 112, 113, 114, for example. Process 500 includes multiple steps taken in the disclosed order. Process 500 also includes implementations including fewer steps or can include the steps taken in different orders.

FIG. 5 and process 500 describe in more detail step 408 from FIG. 4. At step 502, computing device 115 associated with arriving vehicle 302 according to the process 400 determines wait times for service queues. Computing device 115 can determine wait times from service signals received from fueling units 306, 310, 314. Based on matched fuel types and operating characteristics of the fueling units 306, 310, 314, the associated service queue 304, 308, 312 with the lowest wait time can be selected.

At step 504 computing device 115 determines occupant preferences. Occupant preferences can be determined by inputting preferences to computing device 115 by occupant using available input devices, including voice, keyboards, touch screens, and mobile devices. Once input, computing device can combine occupant preferences with selected service queue 304, 308, 312 to determine which service queue 304, 308, 312 queue to join or amenity 334 to visit.

At step 506 computing device 115 associated with arriving vehicle 302 can join a service queue 304, 308, 312. Computing device 115 can receive service signals from fueling units 306, 310, 314 and determine that fueling units 306 and 310 dispense the correct types of fuels and have the correct operating characteristics to refuel arriving vehicle 302. Computing device 115 can receive service signals that indicate that service queue 308 associated with fueling unit 310 has the shortest wait and that last vehicle 330 is the end of the queue.

Computing device 115 associated with arriving vehicle 302 can include occupant preferences regarding refueling station 300. For example, computing device 115 can include occupant preferences for visiting amenities 334, such as restrooms or shops. Occupant preferences can include parking preferences such as requests for handicapped parking or parking close to amenities due to inclement weather. Computing device 115 can determine movements of the arriving vehicle 302 that will satisfy occupant preferences and refuel the arriving vehicle including joining one or more service queues 304, 308, 312 or moving arriving vehicle 302 to amenities 334.

In this example, computing device 115 can direct arriving vehicle 302 to move to amenities 334, park, and permit occupant to get out of the arriving vehicle 302 to visit a restroom, for example. Computing device 115 can then direct vehicle 302 to join service queue 308 by moving arriving vehicle 302 into the service queue 308 into a position behind last vehicle 330, for example. Arriving vehicle 302 can then maintain its place in service queue 308 by following last vehicle 330 as fueling unit 310 completes fueling queued vehicles 320 and they depart as shown by departing vehicle 326 or move to one or more served zones 316 to join served vehicles 324.

Arriving vehicle 302 can maintain its place in the service queue 308 as queued vehicles 320 are refueled and leave the service queue 308. This permits refueling station 300 to refuel a mixture of autonomous, semi-autonomous and occupant-piloted vehicles 318, 320, 322 efficiently while maintaining order, minimizing waiting and satisfying occupant preferences.

While queued vehicles 318, 320, 322 are queued up waiting for refueling, fueling units 306, 310, 314 and queued vehicles 318, 320, 322 continue to transmit and receive service signals and fueling signals. In this manner, as queued vehicles 318, 320, 322 are being refueled, the amount of time remaining to complete refueling can be transmitted to queued vehicles 318, 320, 322 to update the current wait time.

Estimated queue wait times as reported by the fueling units 306, 310, 314 are based on the cumulative activity of 1) vehicles under manual fueling with no wireless dialog on their intent or preferences, combined with 2) vehicles in queue with known requested preferences because those vehicles are transmitting fueling signals via wireless networks and 3) other vehicles not yet there but projected to arrive just before or simultaneously with the when arriving vehicle 302 based on fueling signals received by fueling units 306, 310, 314.

When refueling is complete for a queued vehicle 318, 320, 322, that vehicle can depart service queues 304, 308, 312. Fueling signals and service signals indicating this departure can be transmitted to queued vehicles 318, 320, 322 to permit queued vehicles 318, 320, 322 to adjust the service queues 304, 308, 312 to reflect the change Prior to reaching the head of service queue 308, arriving vehicle 302 can transmit fueling signals including financial information that will permit the fueling unit 310 to dispense fuel. Upon receiving appropriate financial information, when arriving vehicle 302 reaches the head of service queue 308, fueling unit 310 can refuel arriving vehicle 302. Vehicle 302 can transmit fueling signals indicating the length of time remaining to complete refueling and refueling complete, for example.

When refueling is complete, computing device 115 associated with arriving vehicle 302 can move arriving vehicle 302 from the service queue 308 to one or more served zones 316 to join served vehicles 324. In this example, arriving vehicle 302 has dropped an occupant off at amenities 334 and joined service queue 308 for refueling. When refueling is complete, computing device 115 can move arriving vehicle 302 to a served zone 316 near the amenity 334 visited by occupant. In this manner, computing device 115 can refuel arriving vehicle efficiently at a refueling station 300 including a mixture of autonomous vehicles, semi-autonomous vehicles and occupant-piloted vehicles while satisfying occupant preferences by self-scheduling via wireless networks.

When refueling is complete, and occupant has exited the vehicle, to visit amenities 334, computing device 115 can alert occupant that refueling is complete and arriving vehicle 302 is prepared to depart service area 200 via DSRC, BLE or other wireless technologies, for example.

In summary, in FIG. 5 a computing device 115 associated with arriving vehicle 302 can determine wait times based on received service signals and fueling signals, determine occupant preferences by inputting preferences from occupants, and join one or more service queues 304, 308, 312 based on the determined wait times and occupant preferences.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   receiving in a first vehicle one or more service signals from one or more service units;
   transmitting one or more fueling request signals;
   receiving one or more fueling request signals from one or more second vehicles; and
   joining one or more service queues based on the service signals from the one or more service units and the fueling request signals from the one or more second vehicles.

2. The method of claim 1 wherein the fueling request signals include fuel type and occupant preferences.

3. The method of claim 2 further comprising:
   determining wait times for service queues associated with the service units based on the service signals and fueling request signals.

4. The method of claim 3 wherein joining one or more service queues includes moving to one or more zones based on fuel type, wait times and occupant preferences.

5. The method of claim 4 wherein moving to one or more zones includes moving to one or more service queues, moving to one or more service units and moving to one or more served zones.

6. The method of claim 4 wherein moving to one or more zones is performed by an occupant.

7. The method of claim 4 wherein moving to one or more zones is performed by an autonomous vehicle.

8. The method of claim 2 wherein the fuel type includes one or more of liquid petroleum-based fuels, compressed gases or electric charging.

9. The method of claim 1 wherein the service signals and fueling request signals are transmitted and received via a wireless network.

10. The method of claim 1 wherein joining one or more service queues includes identifying a last vehicle of the one or more service queues.

11. An apparatus, comprising:
    a processor; and
    a memory, the memory including instructions to be executed by the processor to:
    receive in a first vehicle one or more service signals from one or more service units;
    transmit one or more fueling request signals;
    receive one or more fueling request signals from one or more second vehicles; and
    join one or more service queues based on the service signals from the one or more service units and the fueling request signals from the one or more second vehicles.

12. The apparatus of claim 11 wherein the fueling request signals include fuel type and occupant preferences.

13. The apparatus of claim 12 further comprising instructions to:
    determine wait times for service queues associated with the service units based on the service signals and the fueling request signals.

14. The apparatus of claim 13 wherein joining one or more service queues includes moving to one or more zones based on fuel type, wait times and occupant preferences.

15. The apparatus of claim 14 wherein moving to one or more zones includes moving to one or more service queues, moving to one or more service units and moving to one or more served zones.

16. The apparatus of claim 14 wherein moving to one or more zones is performed by an occupant.

17. The apparatus of claim 14 wherein moving to one or more zones is performed by an autonomous vehicle.

18. The apparatus of claim 12 wherein the fuel type includes one or more of liquid petroleum-based fuels, compressed gases or electric charging.

19. The apparatus of claim 11 further comprising instructions to:
    transmit and receive the service signals and fueling request signals via a dedicated short range communication network.

20. The apparatus of claim 11 further comprising instructions to:
    identify a last vehicle of the one or more service queues.

* * * * *